(No Model.)
W. B. ROBERTSON, Jr.
PROCESS OF AND APPARATUS FOR OBTAINING BORACIC ACID FROM BORATES.
No. 274,660.  Patented Mar. 27, 1883.
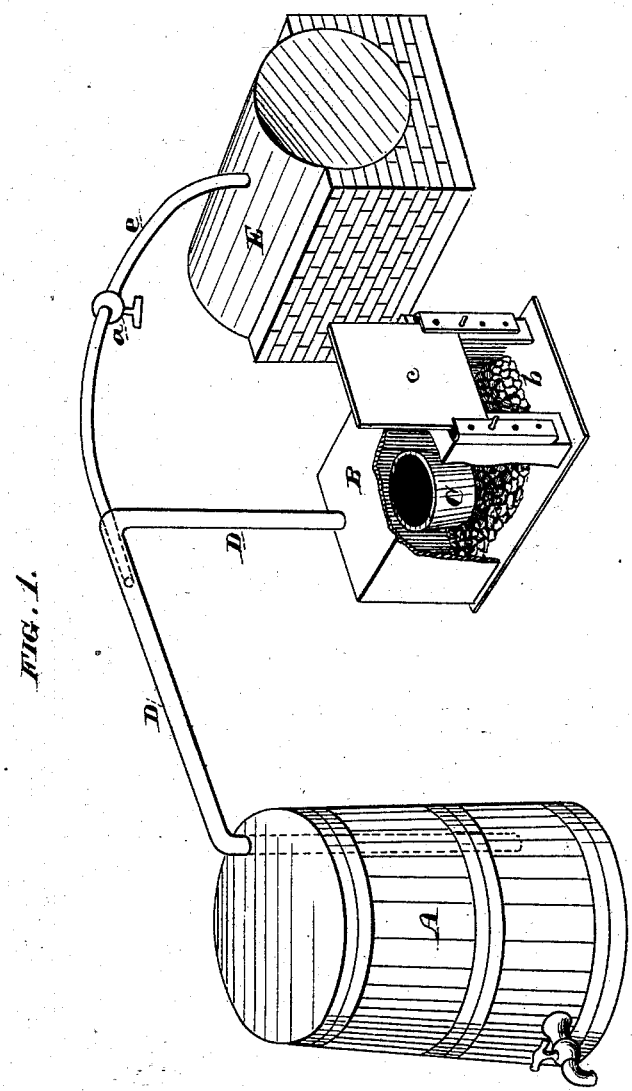
Witnesses;
Geo. H. Strong.
J. H. Rouse.
Inventor,
Wm. B. Robertson jr
By
Dewey & Co.
Attorneys

UNITED STATES PATENT OFFICE.

WILLIAM B. ROBERTSON, JR., OF SAN FRANCISCO, CALIFORNIA.

PROCESS OF AND APPARATUS FOR OBTAINING BORACIC ACID FROM BORATES.

SPECIFICATION forming part of Letters Patent No. 274,660, dated March 27, 1883.

Application filed December 5, 1882. (No model.)

*To all whom it may concern:*

Be it known that I, WILLIAM B. ROBERTSON, Jr., of the city and county of San Francisco, State of California, have invented an Improved Process of and Apparatus for Obtaining Boracic Acid from Borates, of which the following is a specification.

My invention relates to a novel process of and apparatus for obtaining boracic acid ($B_2O_3$) from borates, the latter consisting in a means for forming nitrous and sulphurous vapors and admitting air thereto, and in a means for forcing said vapors into a tank or receptacle containing a suspension or solution of the borate, and the former consisting in treating said solution or suspension with said combined vapors and air, as will hereinafter be more particularly described.

The objects of my invention are two, namely: to set free the boracic acid more rapidly and effectively by the employment of a strong reagent, and to cheapen the cost of the operation by providing a means for making this reagent directly and in close connection with the subject to be acted upon, whereby the necessity of two operations—to wit, the separate and expensive manufacture of the sulphuric acid and its transportation as such to the field of operation—is avoided.

Referring to the accompanying drawing, the figure represents my apparatus.

A is the tank for containing a solution or suspension of a borate in water.

B is an ordinary furnace for containing sulphur to undergo combustion. C is a pot within said furnace, to contain any suitable nitrate. The furnace B has a front aperture, $b$, the capacity of which is regulated by adjusting a sliding door, $c$, whereby more or less air may be admitted. A pipe, D, connects the furnace B with the tank A, and extends down in said tank nearly to its bottom.

E represents a steam-boiler, from which a pipe, $e$, provided with a valve, $a$, extends to the pipe D, into which it is projected.

My process is as follows: In the tank A, I place water and introduce the borate. I do not confine myself to any particular borate, but may use any of them, my process being equally effective upon all. If I introduce borate of soda, a solution is formed; but if I use borate of lime or magnesia they are held in suspension. In the furnace B, I place sulphur and ignite it. The pot C rests right over the sulphur, and contains any suitable nitrate—such as nitrate of soda—which is commonly used in the manufacture of sulphuric acid. In order to start and assist the operation I place in the pot with the nitrate a small quantity of hydrated sulphuric acid. In this furnace are formed, as is well known, the nascent gases of sulphuric acid—namely, the nitrous and sulphurous vapors—which, together with the air drawn in through the front of the aperture $c$, combine to produce the result. The steam from boiler E, passing through pipe $e$, acts as an injector, and forces or carries with it these vapors through pipe D into the borate solution or suspension. The effect of this is that sulphuric acid is formed and introduced directly to the solution. It takes up the soda, lime, magnesia, or whatever may be the base of the borate, and precipitates it as a sulphate. The boracic acid ($B_2O_3$) is set free, and the solution may be drawn off, where it crystallizes in a free state in the proper crystallizing-pans. The effect of the acid in the borate solution is the same, whether this latter be cold or hot—that is, the reaction takes place and the boracic acid is liberated, so that at the beginning of the operation, when the solution is cold, the operation is taking place; but before the process is complete the solution warms up under the steam, so that when ready to be drawn off it is hot enough to provide for the proper crystallization of the boracic acid ($B_2O_3$.) Thus no time is lost, and the means will conduce to the end. This treatment with sulphuric acid formed directly and in connection with the borate solution I deem preferable to the treatment with sulphurous-acid gas, ($SO_2$,) because I obtain a stronger and more effective reagent with as little trouble.

The great advantage which this process has over that in which the hydrated sulphuric acid of commerce is used is that it is more economical, both in trouble and expense.

In the manufacture of sulphuric acid special preparation and apparatus are necessary. It is well known that to make the acid upon a small scale is very unprofitable, and to engage in its manufacture with sure prospects of success an expensive plant is necessary. For this reason it is made in but few localities, and it therefore becomes necessary to purchase it and undertake the extreme risk and high rates of transportation to the place or places where the borates are usually found. Hence by devising a simple and inexpensive means for forming its nascent gases directly and upon the spot, and a process for treating the borates with them, I avoid much expense, while at the same time I fully achieve the results of obtaining the boracic acid. Another advantage in thus treating the borates is that I avoid all the waste which attends the employment of the sulphuric acid of commerce when poured directly into the borate solution.

I am aware that heretofore borates in solution have been treated with sulphurous acid, and hence I do not broadly claim treating borates with any gaseous form of a binary compound of sulphur; but,

Having thus described my invention, what I claim as new, and desire to secure by Letters Patent, is—

1. The process herein described of obtaining boracic acid from borates, consisting in the treatment of the borates, while in suspension or solution, with nitrous and sulphurous vapors and air, introduced together in said solution, substantially as described.

2. The process herein described of obtaining boracic acid from borates, consisting in forming nitrous and sulphurous vapors and introducing them, together with air, into a solution or suspension of the borate, substantially as described.

3. In an apparatus for obtaining boracic acid from borates, the apertured furnace B for sulphur, having an interior vessel, C, for a nitrate, the outlet-pipe D, the steam-boiler E, and the steam-pipe e, entering the outlet-pipe, as shown, in combination with the borate-solution tank A, into which the pipe D is directed, substantially as herein described.

In witness whereof I hereunto set my hand.

WILLIAM B. ROBERTSON, Jr.

Witnesses:
S. H. NOURSE,
G. W. EMERSON.